March 21, 1933. J. C. JACKSON ET AL 1,902,283
TIRE TOOL
Filed Nov. 13, 1931
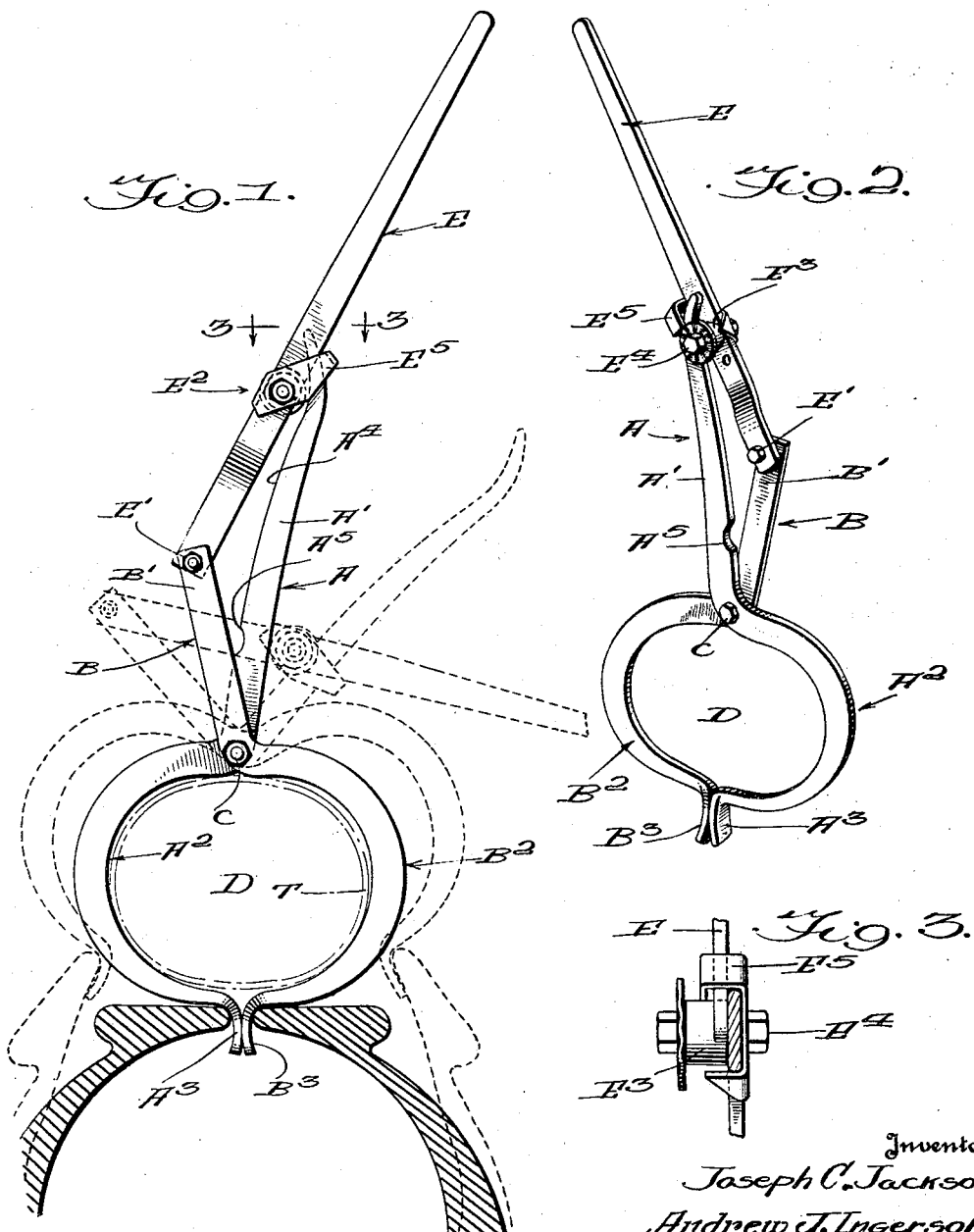

Patented Mar. 21, 1933

1,902,283

UNITED STATES PATENT OFFICE

JOSEPH C. JACKSON AND ANDREW J. INGERSOLL, OF WILDWOOD, NEW JERSEY

TIRE TOOL

Application filed November 13, 1931. Serial No. 574,708.

This invention is a tire tool designed particularly for spreading the adjacent bead portions of a pneumatic tire casing for the purposes of inspection and the insertion and/or removal of an inner tube with respect to the tire casing.

In recent years the increased use of pneumatic tires on heavy vehicles such as passenger buses, trucks and the like, has necessitated the use of pneumatic tire casings of such size and weight that it is impossible for one to separate the bead portions of such casings without the use of some mechanical mechanism, and the tool forming the subject matter of the present invention is designed particularly for such use.

One object of the invention is to provide a tool of the character described which may be easily and quickly inserted in proper position with respect to a tire and which will effectively spread the bead portions of the tire sufficiently for all inspection purposes and for the purpose of inserting and removing inner tubes with respect to the casing.

Another object of the invention is to provide a tool of the character described wherein means are provided for locking the tool in a position such that the bead portions are widely spread, in which position the jaws of the tool are locked open against the force of the inherent resiliency of the tire casing tending to close them.

Another object of the invention is to provide a tool of the character described, including pivoted operating levers interconnected by an improved cam means which enables the tool to be quickly and powerfully actuated.

Another object of the invention is to provide an operating handle associated with the tool in a manner such that it is disposed laterally of the plane of the tire casing, so that no interference exists betwen the operating handle and that portion of the tire casing which is diametrically opposite to the portion which is engaged with the spreading jaws of the tool.

Another object of the invention is to provide, in a tool of the character described, means for supporting an inner tube in a position for insertion within a casing, without danger of pinching the tube by operation of the tool.

These and other objects will become apparent from the following specification when read in connection with the accompanying drawing.

Fig. 1 is a front elevation of the tool disposed in opposite position with respect to a tire casing, Fig. 2 is a perspective view of the tool, and Fig. 3 is a sectional detailed view showing the manner in which the cam and strap are associated with and interconnect the operating levers.

Referring to the drawing more particularly, it will be noted that the tool comprises a pair of lever members indicated generally by the reference characters A and B. Said levers are interconnected intermediate their ends by a pivot member or bolt C, and each lever comprises an operating portion and a work-engaging portion, respectively. The operating portions of the levers are indicated by the reference characters $A^1$ and $B^1$, respectively, while the work-engaging portions are indicated generally by the reference characters $A^2$ and $B^2$, respectively.

Each of the work-engaging portions of the levers includes a bead engaging spreading jaw, $A^3$ and $B^3$, respectively, and between each of said bead spreading jaws and the pivot C, said levers are formed to provide a tube receiving and supporting aperture indicated generally by the reference character D, said tube being indicated in dotted lines in Fig. 1 by the reference character T.

In the embodiment of my invention shown in the drawing, the tube receiving and supporting aperture D is formed by opposed complemental arcuate portions of the levers, said arcuate portions extending from the pivot bolt C to the bead engaging jaws $A^3$, $B^3$. As shown in Fig. 1, when the jaws are in closed position the arcuate portions of the levers form a substantially circular tube receiving aperture, which is positioned immediately adjacent to the inner circumference of the bead portions of the casing. This enables the easy insertion of a tube into the casing when the bead portions are spread and without the possibility of the tube being pinched by the lever arms.

In order to operate the jaws from closed to open position, the operating portions of said levers are interconnected by an operating handle indicated generally by E. The operating handle E is pivotally connected at one end to the operating portion of the lever B by means of a pivot or bolt $E^1$. Intermediate the ends of said handle E, there is provided a cam member indicated generally by $E^2$. The cam member as shown more clearly in Figs. 2 and 3, is in the form of a roller $E^3$ mounted for rotation on the handle E by means of a bolt $E^4$. The cam roller $E^3$ is arranged to ride upon a cam track $A^4$, formed on the operating portion of the lever A, the arrangement being such that when the operating handle E is forced downwardly about the pivot $E^1$, the cam roller $E^3$ rides upon the cam track $A^4$ to cause a spreading action between the operating portions of levers A and B and a corresponding spreading movement of the bead engaging jaws $A^3$, $B^3$. This action of the tool is clearly illustrated in the dotted line showing of Fig. 1.

The cam track $A^4$ is provided adjacent the pivot bolt C with a locking recess $A^5$, designed to receive the cam roller $E^3$ when the jaws have reached a maximum degree of spreading movement. It will be understood that the spreading action of the jaws $A^3$, $B^3$ is resisted by the inherent resiliency of the tire casing, and that the natural tendency of the jaws during spreading movement is to assume a closed position in response to the resiliency of the tire. By providing the locking recess $A^5$ in the cam track $A^4$, the roller $E^3$, when engaged therein, will lock the jaws in an open position against the inherent resiliency of the tire which is seeking to move the jaws to a closed position.

In order to cause the jaws $A^3$ and $B^3$ to be positively moved to a closed position, and to maintain the cam track and cam in operative positions at all times, there is provided a strap or yoke $E^5$, carried by the handle E and embracing the operating portion $A^1$ of the lever A. If the handle E is retracted or raised to the position shown in full lines in Fig. 1 from the position shown in dotted lines in Fig. 1, the strap $E^5$ engaging the outside edge of the operating portion $A^1$ of the lever A causes this lever to be positively moved to the position shown in Fig. 1, in which position the jaws $A^3$, $B^3$ are in closed position.

It is to be noted that the bead engaging jaws $A^3$, $B^3$ are directed outwardly substantially along the longitudinal axis of the tool, and in order to provide a more effective engagement between the jaws and the bead portions of the tire, said jaws may be curved slightly laterally of the longitudinal axis as shown in Fig. 1.

In operation the tool is grasped by the handle E and the natural tendency of the jaws $A^3$, $B^3$ under the action of gravity and the action of the yoke or strap $E^3$ is to cause the jaws to assume a closed position. The jaws $A^3$, $B^3$ are then inserted between the adjacent bead portions of a tire, the main body portion of the tool lying within the space defined by the inner circumference of the bead portion of the tire with the handle E extending laterally of the plane of the casing. The handle E is then forced downwardly, the cam roller $E^3$ engaging the cam track $A^4$ and spreading the operating portions $A^1$, $B^1$ of the levers and correspondingly spreading of the jaws $A^3$, $B^3$ until the roller $E^3$ engages the locking recess $A^5$ of the cam track $A^4$. At this point the levers are locked in the separated position and the bead portions of the tire are spread a sufficient distance to enable one to thoroughly examine the inside of the tire casing for imperfections.

If it is desired to insert a tube within the tire casing, the tube is positioned within the tube receiving and supporting aperture D prior to the time the jaw of the tool is inserted within the tire casing. In this case, the operation of spreading the bead portions of the tire is performed exactly as above outlined, it being noted that by positioning and supporting the tube concentrically within the tire casing and immediately adjacent to the bead portions thereof, said tube may be easily passed within the tire casing when the bead portions thereof have been spread to assume the position shown in dotted lines in Fig. 1.

In conclusion, it is to be noted that we have provided a tire tool in which means are provided for supporting an inner tube in operative position with respect to a tire casing and immediately adjacent to the inner circumference of the bead of the casing. Also, it will be noted that by the interconnection of the levers by the operating handle E and by utilizing the cam member carried by the handle for spreading the levers, a very powerful spreading action may be provided so that the tool may be used to advantage on the heaviest type of pneumatic casings known today. Also the lock which retains the jaws in spread position enables one to release ones hold on the tool if prolonged inspection or repair of the casing is necessary.

Although we have shown in the accompanying drawing a preferred embodiment of our invention, it is to be understood that we do not limit ourselves to the particular details of construction therein shown, but that we may make such changes as fall within the spirit of our invention as defined by the claims appended hereto.

We claim:

1. A tool for spreading the adjacent bead portions of a pneumatic tire casing, comprising a pair of levers pivotally connected intermediate their ends, each of said levers including an operating portion and a tire engaging portion, said portions lying on opposite sides of said pivotal connection, the tire engaging portion of each lever including a tube supporting and embracing portion conforming generally to the exterior surface of the tube and terminating in an outwardly directed spreading jaw.

2. A tube for spreading the adjacent bead portions of a pneumatic tire casing comprising a pair of levers pivotally connected intermediate their ends, each of said levers including an operating portion and a tire engaging portion, said portions lying on opposite sides of said pivotal connection, the tire engaging portion of each lever being rigid and formed to define a concavity, the concavities of each lever being disposed in opposition to each other and, when the tool is closed, together defining a substantially circular tube spanning aperture, each of said levers terminating beyond said tube spanning portion in an outwardly directed bead engaging spreading jaw.

3. A tool for spreading the adjacent bead portions of a pneumatic tire casing comprising a pair of levers pivotally connected intermediate their ends, each of said levers including an operating portion and a tire engaging portion, said portions lying on opposite sides of said pivotal connection, the tire engaging portion of each lever including a bead spreading jaw and means for operatively supporting an inner tube with respect to the tire, said last mentioned means being positioned adjacent to said spreading jaws and being shaped to conform generally to the external surface of the tube, whereby to avoid pinching the tube as the levers are operated to spread the jaws.

4. A tool for spreading the adjacent bead portions of a pneumatic tire casing comprising a pair of levers pivotally connected intermediate their ends, each of said levers terminating in an outwardly directed bead engaging spreading jaw, each of said levers, between said spreading jaw and said pivoted connection, being formed to provide a substantially rigid tube receiving concavity which, when the tool is in use, lies immediately adjacent to the inner circumference of the bead portion of a tire casing whereby when the bead portions are spread the tube may be easily passed from said concavity into the casing.

5. A tool for spreading the adjacent bead portions of a pneumatic tire casing comprising a pair of levers pivotally connected intermediate their ends, each lever terminating at one end in a bead spreading jaw and at the other end in an operating portion, the operating portion of one lever being appreciably longer than that of the other lever and an operating handle pivotally connected to the operating portion of the other lever, said handle extending an appreciable distance beyond the end of the longer operating portion of the first mentioned lever, said handle and the operating portion of said first mentioned lever carrying cooperable cam and track members operable to cause spreading of said bead engaging jaws upon determined movement of the handle.

6. A tool for spreading the adjacent bead portions of a pneumatic tire casing comprising a pair of levers pivotally connected intermediate their ends, each lever terminating at one end in a bead spreading jaw and at the other end in an operating portion, the operating portion of one lever being appreciably longer than that of the other lever provided with a cam track, and an operating handle pivotally connected to the operating portion of the other lever, said handle extending beyond the end of the longer operating portion of the first mentioned lever and carrying a cam member engageable with said cam track for causing spreading of said bead engaging jaws upon predetermined movement of the handle, said operating handle being connected to said levers at an angle so as to be disposed laterally of the plane of the tire casing at all times whereby to prevent interference between said handle and that portion of the tire casing which lies opposite to the portion which is engaged by the tool.

7. A tool for spreading the adjacent bead portions of a penumatic tire casing comprising a pair of levers pivotally connected intermediate their ends, each lever terminating at one end in a bead spreading jaw and at the other end in an operating portion, the operating portion of one lever being provided with a cam track, and an operating handle pivotally connected to the operating portion of the other lever, said handle carrying a cam member engageable with said cam track for causing spreading of said bead engaging jaws upon predetermined movement of the handle, and a yoke carried by said handle and embracing the cam track whereby to maintain the cam track and cam in operative position and to positively move the jaws to closed position when the movement of the handle is reversed.

8. A tool for spreading the adjacent bead portions of a pneumatic tire casing comprising a pair of levers pivotally connected intermediate their ends, each lever terminating at one end in a bead spreading jaw and at the other end in an operating portion, the operating portion of one lever being provided with a cam track, and an operating handle pivotally connected to the operating portion of the other lever, said handle carrying a cam member engageable with said cam track for causing spreading of said bead engaging jaws upon predetermined movement of the handle, said cam member including a roller pivotally mounted on the handle, and said cam track being provided with a recess at one end thereof, said roller being engageable with said recess to lock the jaws in open position against the inherent resiliency of the tire casing.

In testimony whereof we hereunto affix our signatures.

JOSEPH C. JACKSON.
ANDREW J. INGERSOLL.